（12）United States Patent
Woloschyn et al.

(10) Patent No.: US 10,422,864 B2
(45) Date of Patent: Sep. 24, 2019

(54) 3D MEASUREMENT DEVICE WITH ROTOR IN A NESTED CONFIGURATION

(71) Applicant: FARO Technologies, Inc., Lake Mary, FL (US)

(72) Inventors: Andreas Woloschyn, Stuttgart (DE); Christoph Neundorf, Langewiesen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 454 days.

(21) Appl. No.: 15/385,049

(22) Filed: Dec. 20, 2016

(65) Prior Publication Data

US 2017/0184708 A1    Jun. 29, 2017

(30) Foreign Application Priority Data

Dec. 27, 2015    (DE) .................. 10 2015 122 847

(51) Int. Cl.
*G01C 3/08*  (2006.01)
*G01S 7/481*  (2006.01)
(Continued)

(52) U.S. Cl.
CPC ............ *G01S 7/4817* (2013.01); *G01S 7/481* (2013.01); *G01S 7/4813* (2013.01); *G01S 17/42* (2013.01); *G01S 17/89* (2013.01); *G01S 17/32* (2013.01)

(58) Field of Classification Search
CPC .......... G01S 17/42; G01S 17/32; G01S 17/89; G01S 7/481; G01S 7/4813; G01S 7/4817
(Continued)

(56) References Cited

U.S. PATENT DOCUMENTS

| 5,171,984 A | 12/1992 | Van Rosmalen |
| 2015/0096181 A1 | 4/2015 | Plangger et al. |
| 2015/0331108 A1* | 11/2015 | Itami ............... G01S 7/4815 250/214.1 |

FOREIGN PATENT DOCUMENTS

DE    102009015922 A1    10/2010
DE    102009055988 B3    3/2011
(Continued)

OTHER PUBLICATIONS

German Office Action for Application No. 10 201501220847.5 dated Nov. 3, 2016; 5 pgs.
(Continued)

*Primary Examiner* — Mark Hellner
(74) *Attorney, Agent, or Firm* — Cantor Colburn LLP (57) ABSTRACT

A 3D measurement device is provided that includes a base and a measuring head that can be rotated relative to the base about a first axis. A light emitter is provided which emits an emission light beam and a light receiver which receives a reception light beam. A control device determines the distance to an object. The mirror assembly is provided includes a motor housing and a shaft coaxial with the second axis. A motor is provided having a rotor and a stator, the rotor being coupled to the shaft, the stator coupled to the motor housing. A support structure has a body and a sidewall, the sidewall defining a hollow interior region that receives the rotor and the stator, the support structure further having a slanted section. A reflecting mirror is coupled to the slanted section for deflecting the emission light beam and the reception light beam.

20 Claims, 7 Drawing Sheets

(51) Int. Cl.
  *G01S 17/42* (2006.01)
  *G01S 17/89* (2006.01)
  *G01S 17/32* (2006.01)

(58) Field of Classification Search
  USPC .......................................................... 356/4.01
  See application file for complete search history.

(56) References Cited

FOREIGN PATENT DOCUMENTS

| DE | 102012105027 A1 | 1/2013 |
| EP | 2005112 A1 | 12/2008 |
| EP | 2860546 A1 | 4/2015 |

OTHER PUBLICATIONS

Great Britain Search Report for Application No. GB1622193.9 dated Jun. 23, 2017; 4 pgs.

\* cited by examiner

3D MEASUREMENT DEVICE WITH ROTOR IN A NESTED CONFIGURATION

CROSS REFERENCE TO RELATED APPLICATIONS

The present application claims priority to German Patent Application 10 2015 122 847.5 filed on Dec. 27, 2015, the contents of which are incorporated by reference herein.

BACKGROUND

Patent Application DE 10 2009 055 988 B3 discloses a known 3D measurement device, designed as a laser scanner. A measuring head which is rotatable relative to a base about a first axis emits an emitted light beam by means of a light emitter and a mirror which is rotatable relative to the measuring head about a second axis, and receives, by means of the mirror and a light receiver, a reception light beam reflected or otherwise scattered by an object in the environment of the laser scanner. A control and evaluation device determines at least the distance from the object for each of a plurality of measuring points. The angular position sensors assigned to the two axes supply the related angles. With this method, the 3D coordinates of the measuring points can be determined, based on an initial initialization. A frame that supports the mirror is balanced by a variety of recesses. A color camera integrated into the measuring head supplies 2D color images. In EP 2 005 112 B1, a line camera is mounted at the top of the measuring head.

Patent Application DE 10 2009 015 922 A1 discloses a known method in which a scene is registered using multiple scans. To accomplish this, after generating one scan, the laser scanner is moved to a new location to generate another scan. The measuring points of the generated scans are registered in a common system of coordinates, and the measuring points together form a three-dimensional point cloud.

BRIEF DESCRIPTION

According to one aspect of the disclosure a 3D measurement device for optically scanning and measuring an environment. The 3D measurement device includes a base and a measuring head. The measuring head can be rotated relative to the base about a first axis. A light emitter is provided that emits an emission light beam, a light receiver which receives a reception light beam that is reflected or otherwise scattered by an object in the environment of the 3D measurement device. A control and evaluation device is provided that determines at least the distance from the object for each of a plurality of measuring points. A mirror assembly is disposed within the measuring head. The mirror assembly includes a motor housing that is stationary relative to the measuring head. A shaft is arranged coaxial with the second axis. A motor is provided having a rotor and a stator, the rotor being coupled to the shaft, the stator coupled to the motor housing. A support structure is provided having a body portion and a sidewall extending therefrom, the body portion coupled to the shaft, the sidewall defining a hollow interior region sized to receive at least a portion of the rotor and the stator, the support structure further having a slanted section. A reflecting mirror is coupled to the slanted section which is rotatable about a second axis for deflecting the emission light beam and the reception light beam.

According to another aspect of the disclosure a method of balancing a mirror assembly for a 3D measurement device is provided. The method includes providing a motor having a rotor coupled to a shaft, the shaft mounted on a first bearing and a second bearing with the rotor disposed therebetween, the motor further having a stator disposed about the rotor. A motor housing is provided that is coupled to the first bearing and second bearing. A support structure is coupled to one end of the shaft, the support structure having a slanted section and a sidewall, the sidewall defining a hollow interior portion, wherein at least a portion of the motor and motor housing is disposed within the hollow interior portion, the sidewall having a plurality of bore holes. At least one pin is inserted into one of the bore holes to balance the mirror assembly.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiment of the disclosure include advantages in a mirror assembly for a 3D measurement device that provide for a stable rotation of a mirror. Further embodiments of the disclosure include advantages in a compact mirror assembly that provides for stable rotation of the mirror. Still further embodiments of the invention include advantages in a mirror assembly that facilitates balancing of the assembly to reduce or eliminate imbalances due to manufacturing.

In accordance with an embodiment, a rotary support structure comprises a slanted section and a sidewall that defines a hollow interior region, provided along the second axis. The function of the slanted section is to support the mirror, and the function of the hollow interior region is to accommodate the electric motor. The electric motor for the rotary support structure has a stationary housing, relative to which the rotary support structure rotates, wherein the rotary support structure can be co-rotatably seated on a shaft. The electric motor of the rotary drive acts on the area between housing and rotary support structure or between housing and shaft, preferably with permanent magnets fixed to the shaft and with stator coils fixed to the housing.

In a nested configuration, the hollow interior region of the rotary support structure at least partially overlaps the stator, the rotor and the housing. In an embodiment, the hollow interior region of the rotary support structure accommodates the electric motor indirectly rather than directly. In an embodiment this nested configuration, the hollow interior region of the rotary support structure also engages into an annular receiving space between the rotary support structure and a drive housing for the motor.

In an embodiment, a nested configuration of housing, electric motor, rotary support structure and the optionally provided shaft is understood as an arrangement of stationary and rotating components, alternating radially relative to the second axis. Such a nested configuration conserves installation space along the second axis, thereby shortening the electric motor and mirror assembly.

The mirror's deflects the emission and reception light beams based on a slanted or angled arrangement of the mirror relative to the beam path. Accordingly, the slanted section of the support structure that supports the mirror is designed as asymmetrical (not rotationally symmetrical), which in turn typically results in a balancing of the rotary support structure. The rotary support structure is also perpetually balanced by the hollow interior region of the rotary support structure, which in an embodiment is integral with the slanted section and may also have an asymmetrical shape. Means for perpetually balancing the rotary support structure include, for example, various recesses into the material of the support structure. However, these means can only compensate for imbalances of a perfectly mounted rotary support structure. Therefore, in some embodiments the rotary support structure has a means for adjustable balancing.

These means may include bore holes in the rotary support structure, into which pins made of a dense material, such as steel or tungsten, can be inserted. Usefully, a plurality of bore holes are arranged in a plurality of planes are provided in the rotary support structure. The number of pins and their length enable a rough adjustment, and the insertion depth of each of the pins used enable a stepless fine adjustment. The bore holes and pins may be provided as having threads, which facilitates the adjustment of the insertion depth in both possible directions.

In an embodiment, an arrangement of the bore holes parallel to the second axis as the rotational axis of the rotary support structure allows for easy accessibility to all bore holes through a single opening in the drive housing, for example for checking and adjusting the balanced rotary support structure when the electric motor is in the assembled state. The bore holes are thus formed in the sidewall of the rotary support structure, giving the sidewall an additional function.

Figure 1:
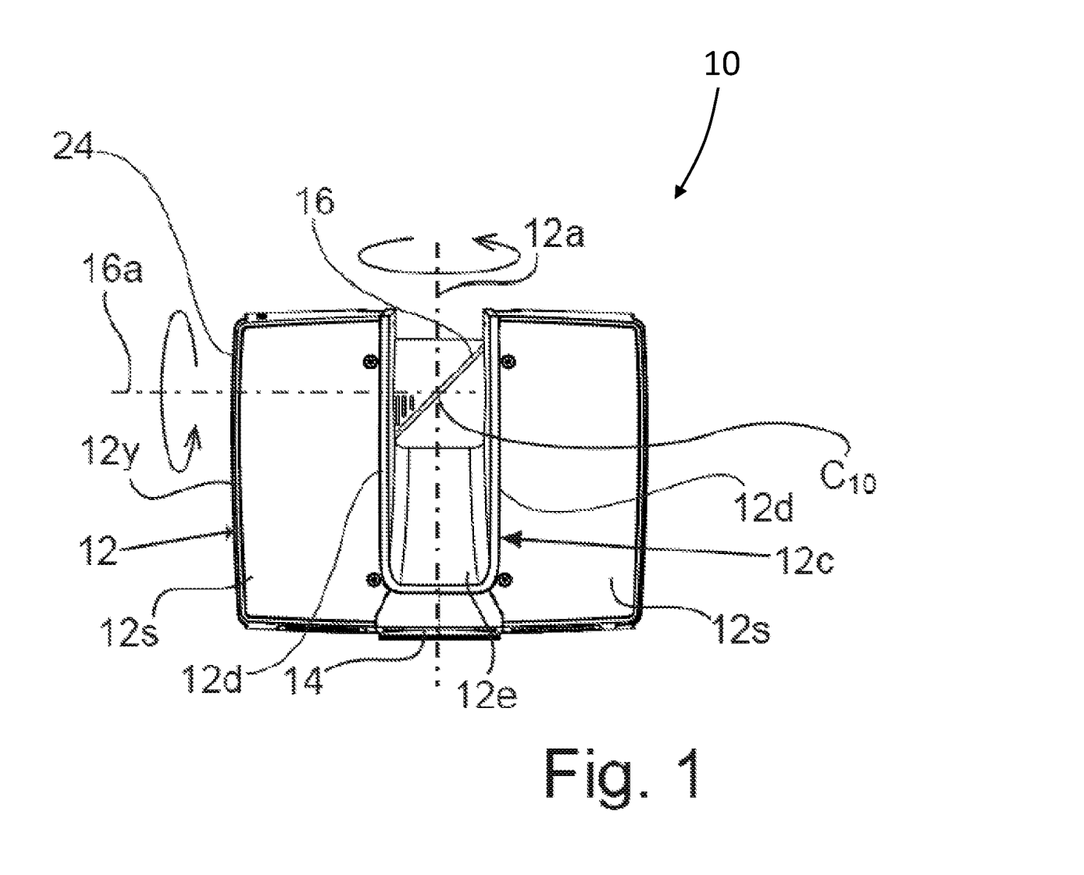
FIG. 1 is a side view of an example of a 3D measurement device.
Figure 2:
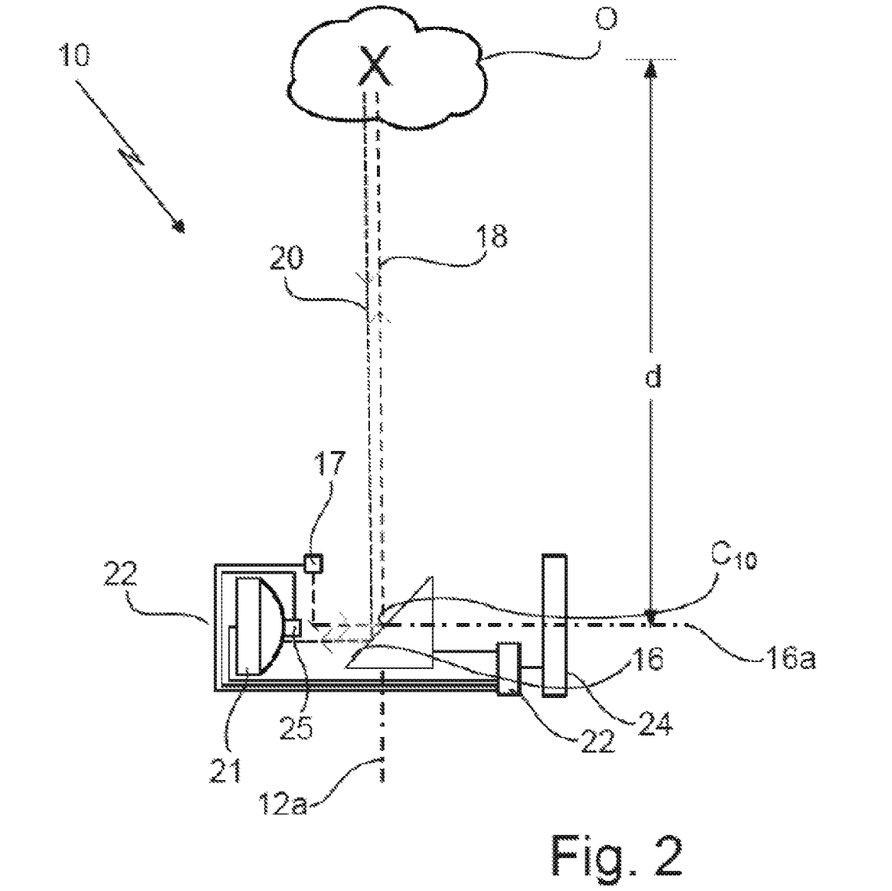
FIG. 2 is a schematic representation of the beam path, including a number of optical and electronic components.

Embodiments of this disclosure relate to a 3D (coordinate) measurement device which directs a beam of light onto an object O (FIG. 2), which may be either a (cooperative) target, such as a reflector, or a non-cooperative target, for example a diffusely scattering surface of the object O. A distance meter in the 3D measurement device measures the distance to the object O (i.e., the distance d between the 3D measurement device and the object O), and angular position sensors measure the angular positions of two axes in the device. The measured distance and the two angles enable a processor in the device to determine the 3D coordinates of the object O. In an embodiment, the 3D measurement device in question is a laser scanner 10 (FIG. 2), however it also include a laser tracker or a total station. Such a device may also be used in cases in which the 3D measurement device is used for measuring distance using projector-camera assemblies, triangulation, epipolar geometry or strip geometries.

Laser scanners are typically used for scanning closed or open spaces such as building interiors, industrial facilities and tunnels. Laser scanners are used for many purposes, including building information modeling (BIM), industrial analyses, accident reconstruction applications, archaeological studies and forensic investigations. A laser scanner can be used for optically detecting and measuring objects in the environment of the laser scanner by registering data points that represent objects within the environment. Such data points are obtained by directing a light beam onto the objects and collecting the reflected or scattered light to determine the distance, two angles (i.e., an azimuthal angle and a zenith angle), and optionally a gray scale value. These raw scan data are collected, stored and sent to one or more computers to generate a three-dimensional image that represents the scanned area or the scanned object. To generate the image, at least three values are collected for each data point. These three values may comprise the distance and two angles, or may be converted values, such as x, y, z coordinates.

Referring to FIGS. 1-7 a laser scanner 10 is shown for optically scanning and measuring the environment of laser scanner 10. Laser scanner 10 has a measuring head 12 and a base 14. Measuring head 12 is mounted on base 14 such that measuring head 12 can be rotated about a first axis 12a relative to base 14, driven by a first rotary drive. This rotation about the first axis 12a can take place around the center of base 14. Measuring head 12 has a mirror 16, which can rotate about a second axis 16a, driven by a second rotary drive. With respect to a normal, upright (with respect to the gravitational direction) position of laser scanner 10, the first axis 12a can be designated as the vertical axis, or azimuthal axis, and the second axis 16a can be designated as the horizontal axis or zenith axis. Laser scanner 10 can have a cardan point or center C10 which is the point of intersection of the first axis 12a and the second axis 16a. The first axis 12a defines the terms "top" and "bottom", even when the axis is slanted relative to the gravitational direction.

Figure 3:
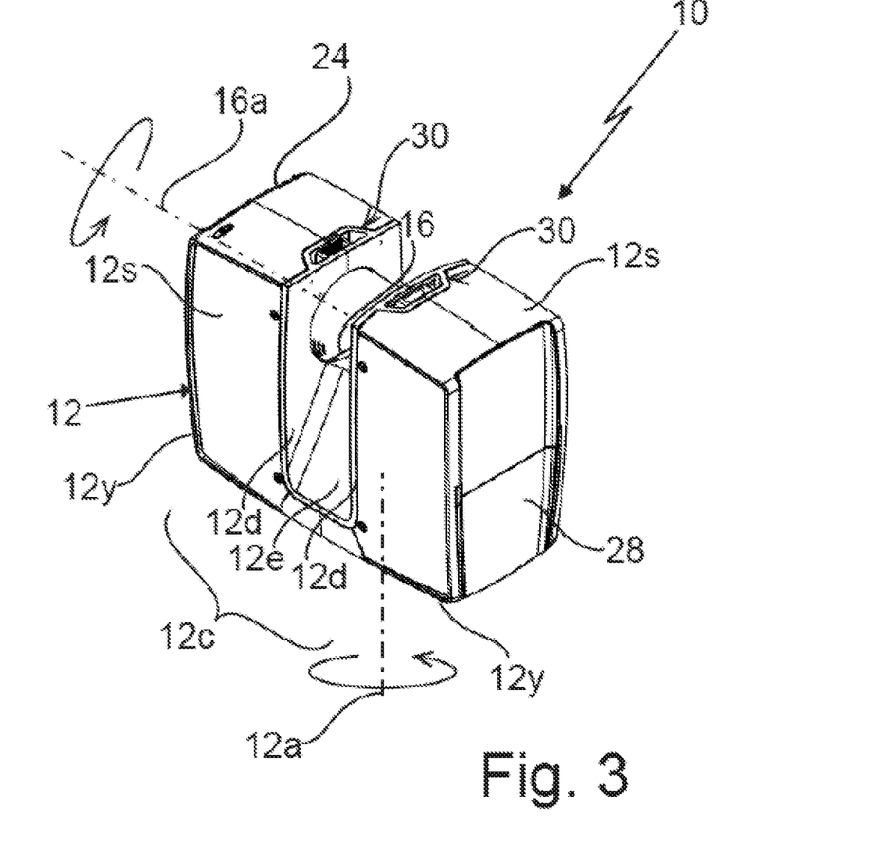
FIG. 3 is a perspective view of the 3D measurement device.
Figure 4:
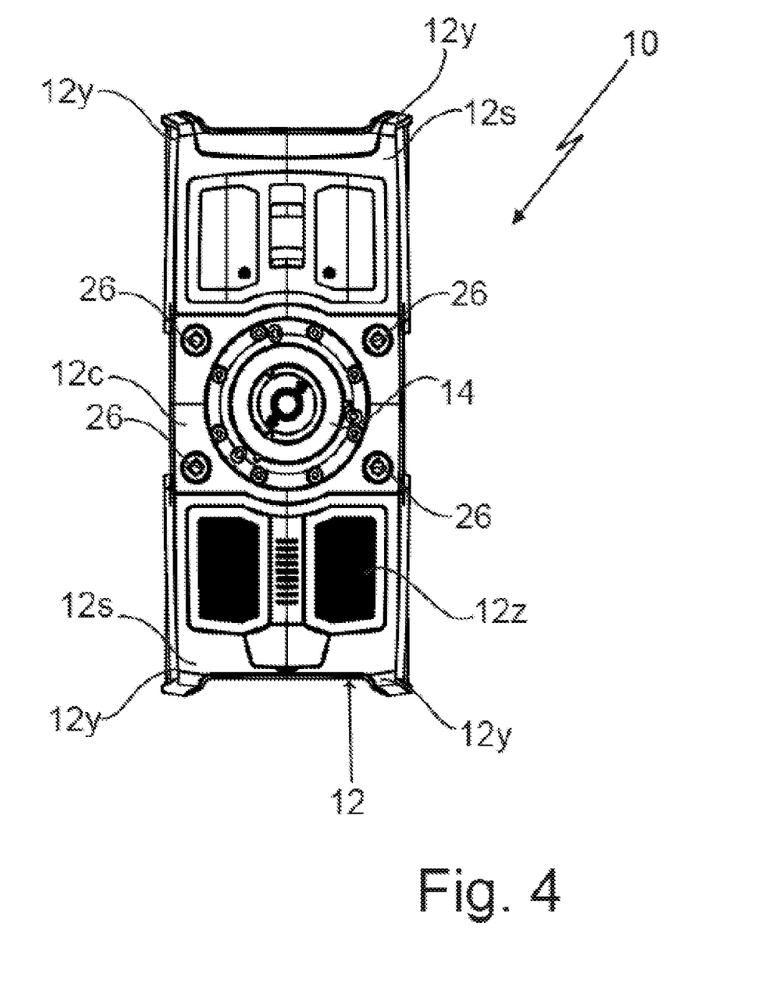
FIG. 4 a view from the bottom of the 3D measurement device.

In the embodiment of FIG. 3, the measuring head 12 has a support structure 12c in the form of a rigid supporting structure to which all other components of measuring head 12 are at least indirectly attached, and which is preferably an integral component made of metal, for example by aluminum die casting. Support structure 12c has two walls 12d, which are parallel to one another and to the first axis 12a, and has a cross-member 12e, which connects the two walls 12d in the region of their lower ends. Cross-member 12e is rotatably mounted on base 14 and holds the first rotary drive, designed for rotating measuring head 12 about first axis 12a, and the associated angular position sensor. In the upper region of walls 12d, i.e. above cross-member 12e, an open space is provided, within which mirror 16 is arranged, supported by one of the two walls 12d.

On each of two sides of support structure 12c, measuring head 12 further has a shell 12s, preferably made of a hard plastic. Each of the two shells 12s is associated with one of the two walls 12d and secured thereto (and therefore to support structure 12c), for example by means of screws. Support structure 12c and the two shells 12s form a housing for measuring head 12. The outer edges 12y of shells 12s are those edges of shells 12s that do not rest against support structure 12c. Outer edges 12y define a volume within which measuring head 12 in its entirety is arranged. To protect measuring head 12 from damage, outer edges 12y may be reinforced, and in the present embodiment are provided as protruding, thickened areas of material (beads) that are integral with the associated shell 12s. In some embodiments, outer edges 12y may be reinforced by a separate bracket.

An upper region of shell 12s on the side of mirror 16 ("mirror-side" shell 12s) holds an electric motor for rotating mirror 16 about second axis 16a, along with the associated angular position sensor, and a lower region holds cooling mechanism 12z (FIG. 4) for the rotary drive and electric motor. The other shell 12s, on the side opposite mirror 16 ("receiver side" shell 12s), may hold some of the optical and electronic components described in the following, along with the power supply, such as the sensitive components that are arranged separates from the rotary drive and electric motor with their electromagnetic interference fields.

Measuring head 12 has an emitter for emitting electromagnetic radiation, for example, a light emitter 17, which emits an emission light beam 18. In an embodiment, emission light beam 18 is a coherent light such as a laser beam. The laser beam may have a wavelength ranging from about 300 to 1600 nm, for example 790 nm, 905 nm, 1570 nm, or less than 400 nm. In principle, however, other electromagnetic waves having higher or lower wavelengths may be used. Emission light beam 18 may be amplitude-modulated or intensity-modulated, for example, with a sinusoidal or rectangular waveform. In other embodiments, emission light beam 18 may also be modulated differently, for example by a chirp signal, or coherent receiving methods may be used. Emission light beam 18 is sent by light emitter 17 to mirror 16, where it is deflected and emitted to the environment of laser scanner 10.

A reflected light beam, hereinafter referred to as reception light beam 20, is reflected by an object O in the environment. The reflected or scattered light is captured by mirror 16 and deflected onto a light receiver 21 having reception optics. The directions of emission light beam 18 and reception light beam 20 result from the angular positions of measuring head 12 and mirror 16 about axis 12a or 16a. These angular positions are in turn dependent on the respective rotary drives. The angular position about first axis 12a is detected by a first angular position sensor. The angular position about second axis 16a is detected by a second angular position sensor. Mirror 16 is angled or slanted 45° relative to second axis 16a. It thus deflects all incident beams by 90°, i.e., both emission light beam 18, which is incident along the second axis 16a, and reception light beam 20, which is deflected parallel to the second axis 16a toward the reception optics.

A control and evaluation device 22 is data-connected to light emitter 17 and to light receiver 21 in measuring head 12. Since control and evaluation device 22 is a less sensitive component than light receiver 21, it may be located in various places in measuring head 12. In the present embodiment, it is located for the most part within the mirror-side shell 12s. Parts of control and evaluation device 22 may also be arranged outside of measuring head 12, for example as a computer connected to base 14. Control and evaluation device 22 is designed to determine, for a plurality of measuring points X, a corresponding number of distances d between laser scanner 10 and measuring points X on object O. The distance from a specific measuring point X is determined at least in part by the speed of light in the air through which the electromagnetic radiation is propagated from the device to measuring point X. In the exemplary embodiment, the phase shift in the modulated light beam 18, 20, which is sent to the measuring point X and received from there, is determined and is evaluated to obtain a measured distance d.

The speed of light in air is dependent on the characteristics of the air such as air temperature, air pressure, relative humidity and carbon dioxide concentration. These air characteristics influence the refraction index of the air. The speed of light in air is equal to the speed of light in a vacuum divided by the refraction index. A laser scanner of the type described herein is based on the light propagation time in air (the propagation time required for light to travel from the device up to the object and back to the device). A method for distance measurement based on the light propagation time (or the propagation time of another type of electromagnetic radiation) is dependent on the speed of light in air and is therefore easily distinguishable from distance measurement methods based on triangulation. In methods based on triangulation, light is emitted by its light source in a certain direction, and is then collected on a camera pixel in a certain direction. Since the distance between the camera and the projector is known, and since a projected angle is compared with a receiving angle, the triangulation method allows the distance from the object to be determined based on a known length and two known angles of a triangle. The triangulation method thus is not dependent directly on the speed of light in air.

Measuring head 12 may include a pointing and display device 24, which is integrated into laser scanner 10. Pointing and display device 24 may be equipped with a user interface, for example, which allows the operator to supply laser scanner 10 with measurement instructions, in particular to define the parameters or to start the operation of laser scanner 10, and pointing and display device 24 may also display measurement results—in addition to parameters. In the exemplary embodiment, pointing and display device 24 is located on the end face of mirror-side shell 12s, and its user interface is designed as a graphic touch screen.

In addition to detecting distance d from center C10 to a measuring point X, laser scanner 10 can also detect a gray scale value with respect to the received optical power. The gray scale value can be determined, for example, by integrating the bandpass-filtered and amplified signal in the light receiver 21 over a measurement period assigned to measuring points X. In some embodiments, a color camera 25 may be used for generating color images. Using these color images, colors (R, G, B) may also be assigned as additional values to measuring points X.

In one operating mode of laser scanner 10, sometimes referred to as the "sphere mode", the environment around laser scanner 10 is scanned by rapidly rotating mirror 16 around second axis 16a while measuring head 12 rotates slowly around first axis 12a. In one embodiment example, mirror 16 rotates at a maximum speed of 5820 revolutions per minute. A scan is defined as the totality of measuring points X in such a measurement. For such a scan, center C10 defines the origin of the local stationary reference system. Base 14 rests in this local stationary reference system. In sphere mode, the scan corresponds to a spherical point cloud, apart from the area which is shaded by cross-member 12e.

In another operating mode of laser scanner 10, sometimes referred to as the "helix" mode, mirror 16 rotates about second axis 16a, while measuring head 12 remains stationary relative to base 14. Laser scanner 10 is mounted on a carriage, for example, which moves when laser scanner 10 is in use. In helix mode, the scan has a helical shape. Measuring head 12 preferably has immobilization means 26 for immobilizing measuring head 12 on the carriage, optionally provided on base 14 or some other support that supports both base 14 and measuring head 12. Immobilization means 26 bridge the bearing between measuring head 12 and base 14, thereby protecting against damage. The immobilization means may also make it unnecessary to immobilize base 14 on the carriage (which would also be advantageous in terms of redundancies), i.e. laser scanner 10 as a whole is immobilized on the carriage simply via immobilization means 26. In this embodiment, immobilization means 26 is designed as threaded bores, via which measuring head 12 can be screw connected to the carriage or other support.

Light emitter 17, light receiver 21 and the associated optics are arranged in an upper region of the receiver-side shell 12s of measuring head 12. In the lower region of this receiver-side shell 12s, a battery pack 28 which serves as the power supply for laser scanner 10 is arranged, preferably behind a protective cover, which can be at least partially removed from shell 12s. In an embodiment, the protective cover is a pivotable protective lid. Battery pack 28 is may be configured as replaceable and rechargeable.

Figure 5:
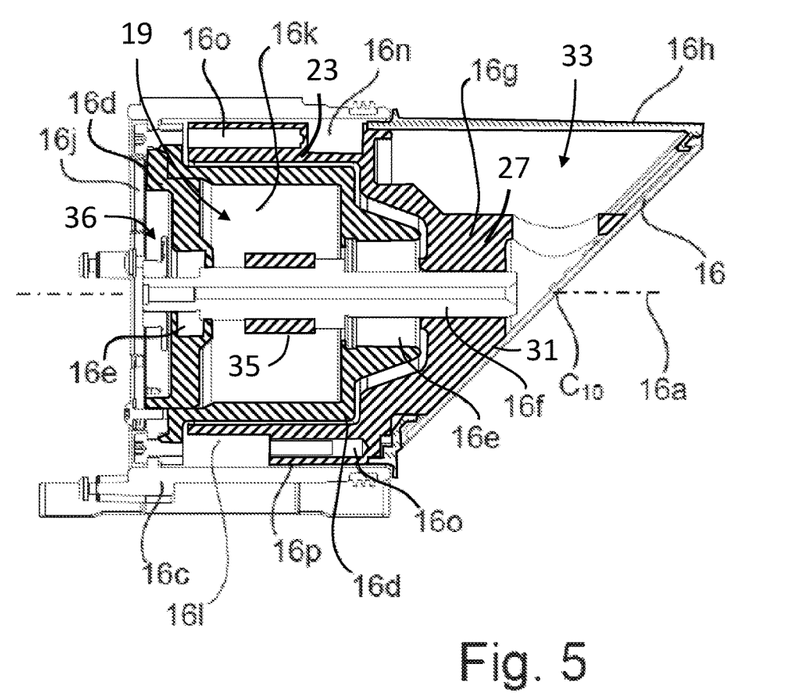
FIG. 5 a cross-section of the rotary drive for the mirror.

As shown in FIG. 5, the electric motor 19 provided for mirror 16 has a drive housing 16c which is fixedly connected to support structure 12c. Drive housing 16c has approximately the shape of a horizontal hollow cylinder from which cooling fins and mounting areas protrude, for example. Within drive housing 16c, a motor housing 16d is arranged. In the exemplary embodiment, the motor housing 16d is formed from two components that are coupled. Motor housing 16d may be configured to be rotationally symmetrical to the second axis 16a and arranged around said axis, and is attached at one end to drive housing 16c and is otherwise spaced from the inner wall of drive housing 16c, producing an annular receiving space in drive housing 16c.

At least two bearings 16e in motor housing 16d support a shaft 16f, which is rotatable about the second axis 16a (and defines said axis). In the exemplary embodiment, two bearings 16e braced axially fixed against one another, and one spring preloaded bearing 16e are provided as bearings 16e, so that the stiffness of the bearing arrangement is not position-dependent. On shaft 16f, more precisely at the end thereof that projects out of drive housing 16c, a rotary support structure 16g is seated. rotary support structure 16g is at least co-rotatably connected to shaft 16f, and mounted thereon.

Figure 6:
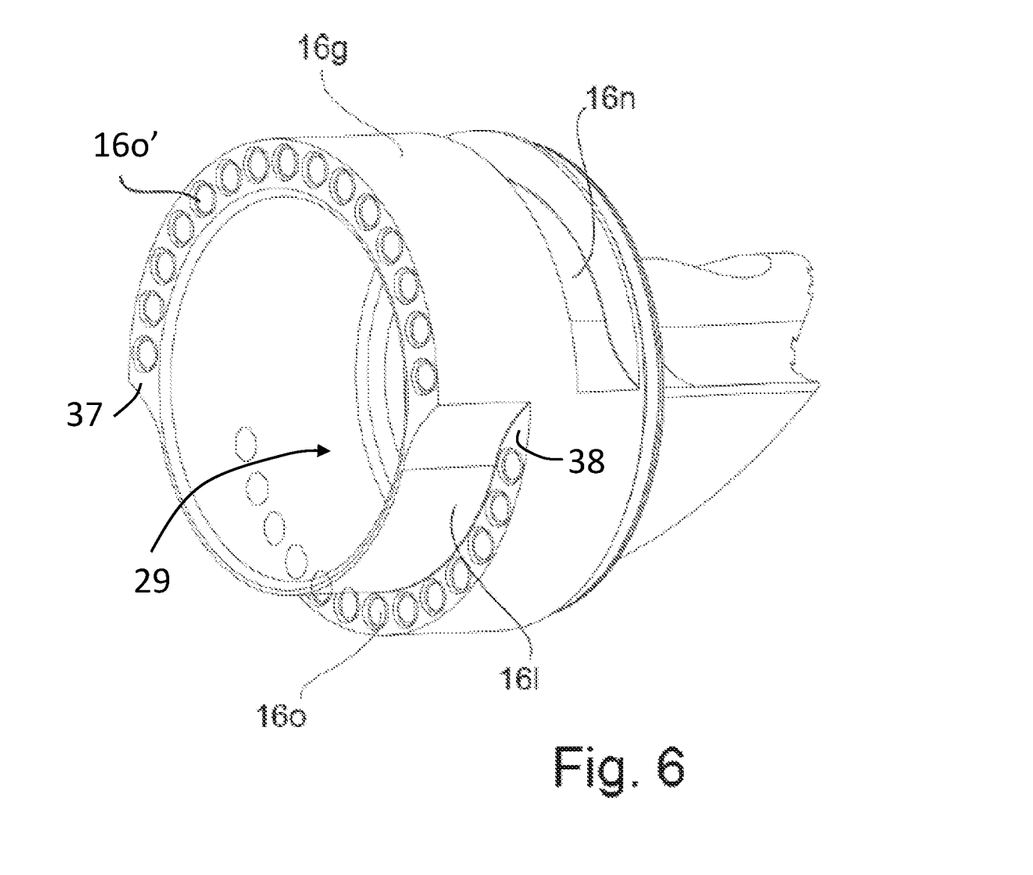
FIG. 6 a perspective view of a support structure that supports the mirror.
Figure 7:
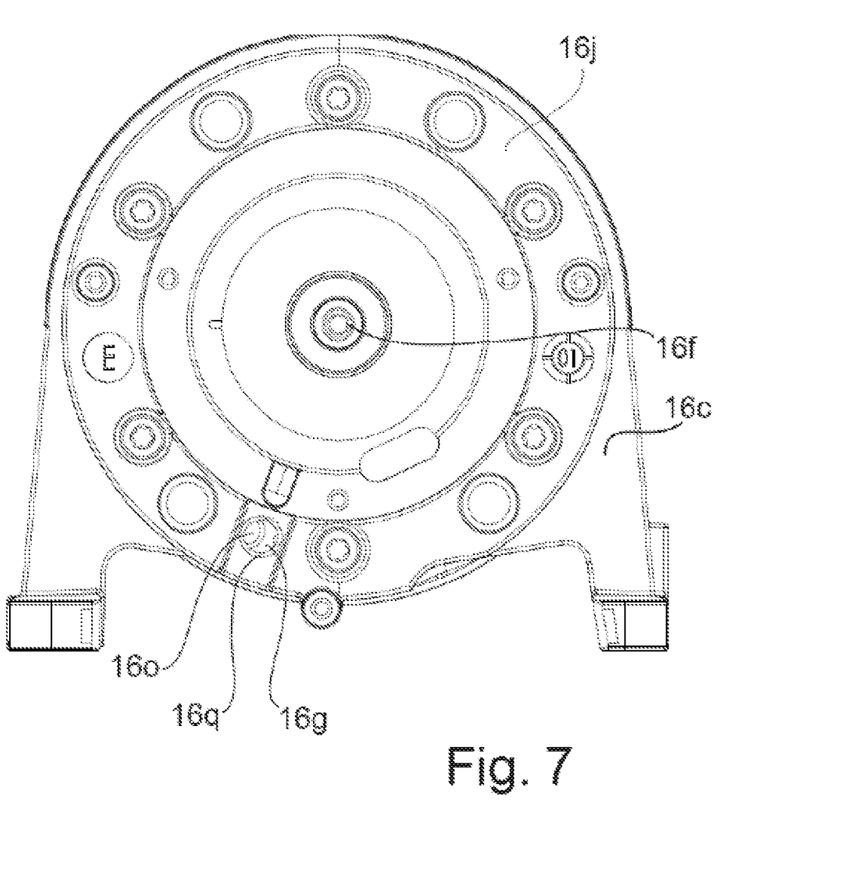
FIG. 7 a frontal view of the rotary drive for the mirror.

Rotary support structure 16g has an integrally formed metallic body, made from a material such as aluminum. Along the second axis 16a, rotary support structure 16g has two adjacent sections, a sidewall 23 and a body portion 27. In an embodiment, the sidewall 23 is generally cylindrical in shape and defines a hollow interior region 29 (FIG. 6). As will be discussed in more detail herein, the hollow interior region 29 is sized to receive the electric motor 19. The body portion 27 also includes a slanted section having an angled surface 31. The slanted section of rotary support structure 16g can be inscribed within a cylinder that has been truncated at an angle of 45° (relative to second axis 16a). The slanted section of rotary support structure 16g supports mirror 16, i.e. mirror 16 is attached, for example glued, to rotary support structure 16g—on the angled surface 31 thereof. In addition to mirror 16, additional structures may be provided on rotary support structure 16g, for example, separately formed means for securing mirror 16 or faceplates for covering cavities. In the present case, such a faceplate 16h is attached to rotary support structure 16g, overlapping the edge of mirror 16 and also covering a large recess 33. Thus the slanted section of rotary support structure 16g including its structures (mirror 16 and faceplate 16h), is also outwardly visible in the shape of the slanted truncated cylinder.

In an embodiment, the sidewall 23 of rotary support structure 16g has an asymmetrical shape composed of two sidewall sections. One end of rotary support structure 16g—its sidewall section—extends into the annular receiving area of drive housing 16c (between the inner wall of drive housing 16c and motor housing 16d), while its other, slanted section (including mirror 16 and in the present case faceplate 16h) projects outward from drive housing 16c. In addition to being distinguishable as comprising two sections (sidewall section, slanted section) along the second axis 16a, rotary support structure 16g can also be subdivided by a plane containing the second axis 16a into two sub-sections, since half of mirror 16 projects outward (from drive housing 16c) beyond center C10. The correspondingly associated sub-section of rotary support structure 16g is referred to as the longer sub-section, while the remaining sub-section is referred to as the shorter sub-section. Each of the two sub-sections contains one of the two sidewalls.

At its end that faces away from mirror 16, drive housing 16c is closed off by a cover 16j. Between cover 16j and motor housing 16d, a (cylindrical) installation space is provided, into which the end of shaft 16f extends and which holds the angular position sensor 36. Between the bearings 16e for shaft 16f, which are spaced from one another, an (annular) installation space is formed between shaft 16f and motor housing 16d, which holds a stator 16k. Stator 16k, which operates between motor housing 16d and shaft 16f (and thus between motor housing 16d and rotary support structure 16g), may include coils that cooperate with a rotor 35 having permanent magnets on shaft 16f to rotate the support structure 16g and mirror 16. In structural terms, motor housing 16d accommodates stator 16k, while rotary support structure 16g in turn overlaps the part of motor housing 16d that accommodates stator 16k. Ultimately, due to this nesting configuration, rotary support structure 16g accommodates stator 16k, i.e. the sidewall 23 of rotary support structure 16g which adjoins the slanted section serves as a housing for stator 16k. The nested configuration shortens the length of the electric motor 19 along the second axis 16a. In another embodiment, stator 16k is arranged outside of motor housing 16d and operates directly between motor housing 16d and rotary support structure 16g.

Despite its asymmetrical shape with sub-sections of different lengths, rotary support structure 16g, together with its structures, in particular mirror 16 (and in the present case also faceplate 16h—the mass of which is negligible), is at least approximately (perpetually) balanced. For this purpose, the two sub-sections have various material recesses. The shorter sub-section has an annular shoulder 161 adjacent the end 37 (FIG. 6). The longer sub-section has a large recess on the mirror-side end, which together with faceplate 16h forms a large cavity 33, and also has an annular groove 16n at approximately one-half its length, which in the exemplary embodiment is likewise arranged in the sidewall 23.

From the end 37 of rotary support structure 16g (i.e. in the sidewall 23 section), a plurality of bore holes 16o' are introduced parallel to the second axis 16a into the longer sub-section, in this case twelve bore holes 16o', each having an internal thread. From the surface 38 of shoulder 161 which is parallel to the end 37 of rotary support structure 16g (likewise in the sidewall 23), a plurality of bore holes 16o are likewise introduced parallel to the second axis 16a into the shorter rotor sub-section, in the exemplary embodiment, likewise twelve bore holes 16o having an internal thread. Each of bore holes 16o, 16o' of both sub-sections are spaced the same distance from shaft 16f.

In addition to these described means for perpetually balancing rotary support structure 16g, means for its adjustable balancing are provided. For this purpose, pins 16p can be introduced into each of bore holes 16o, 16o', said pins in this case being configured as threaded pins which can be screwed into the bore holes 16o, 16o'. For inserting pins 16p, a marked opening 16q is formed at one location on cover 16j. By rotating rotary support structure 16g, each of its bore holes 16o, 16o' can be arranged such that it aligns with opening 16q. Any imbalances that may result from manufacturing tolerances of the component parts (rotary support structure 16g, mirror 16, faceplate 16h) or during storage can then be adjustably compensated for by inserting one or more pins 16p—through opening 16q and into bore holes 16o, 16o'. The means for adjustable balancing allow for stepless adjustment, since not only the number of pins 16p used and their length, but also the insertion depths of pins 16p used can be variably selected.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A 3D measurement device for optically scanning and measuring an environment, the 3D measurement device comprising:
    a base;
    a measuring head, which can be rotated relative to the base about a first axis;
    a light emitter which emits an emission light beam, a light receiver which receives a reception light beam that is reflected or otherwise scattered by an object in the environment of the 3D measurement device;
    a control and evaluation device, which determines a distance to the object for each of a plurality of measuring points;
    a mirror assembly disposed within the measuring head, the mirror assembly comprising:
    a motor housing that is stationary relative to the measuring head;
    a shaft arranged to rotate about a second axis;
    a motor having a rotor and a stator, the rotor being coupled to the shaft, the stator coupled to the motor housing;
    a support structure having a body portion and a sidewall extending therefrom, the body portion coupled to the shaft, the sidewall defining a hollow interior region sized to receive at least a portion of the rotor and the stator, the support structure further having a slanted section; and
    a reflecting mirror coupled to the slanted section which is rotatable about the second axis for deflecting the emission light beam and the reception light beam.

2. The 3D measurement device of claim 1, wherein the support structure includes a first member having the body portion and the sidewall, and a second member that further supports the reflecting mirror.

3. The 3D measurement device of claim 2, wherein the second member has an end surface, a perimeter of the reflecting mirror being supported by the end surface.

4. The 3D measurement device of claim 1, further comprising:
    a first bearing coupled adjacent an end of the shaft on a first side of the rotor;
    a second bearing coupled to the shaft on second opposing side of the rotor; and
    wherein the first bearing and the second bearing are further coupled to the motor housing.

5. The 3D measurement device of claim 1, further comprising a drive housing disposed about and coupled to the motor housing.

6. The 3D measurement device of claim 5, wherein the sidewall extends into an annular area between the drive housing and the motor housing.

7. The 3D measurement device of claim 6, wherein the sidewall includes a means for adjustably balancing the rotor.

8. The 3D measurement device of claim 7, wherein the means for adjustably balancing the rotor includes a plurality of bore holes arranged in the sidewall and at least one pin received in at least one of the plurality of bore holes.

9. The 3D measurement device of claim 8, further comprising a cover coupled to the motor housing, the cover having and opening arranged to be selectively aligned with the plurality of bore holes.

10. The 3D measurement device of claim 9, wherein the sidewall includes a first portion and a second portion, the first portion having an end adjacent the cover, the second portion being defined by a shoulder having a surface.

11. The 3D measurement device of claim 10, wherein the plurality of bore holes includes a first plurality of bore holes and a second plurality of bore holes, the first plurality of bore holes being disposed in the end of the sidewall first portion, the second plurality of bore holes being disposed in the shoulder surface.

12. The 3D measurement device of claim 11, wherein each of the first plurality of bore holes and second plurality of bore holes are parallel to the second axis.

13. The 3D measurement device of claim 10, wherein the first portion includes an annular groove arranged on an opposite side from the shoulder.

14. The 3D measurement device of claim 1, wherein the slanted section is arranged on a 45 degree angle relative to the second axis.

15. A method of balancing a mirror assembly for a 3D measurement device, the method comprising:
    providing a motor having a rotor coupled to a shaft, the shaft mounted on a first bearing and a second bearing with the rotor disposed therebetween, the motor further having a stator disposed about the rotor;
    providing a motor housing coupled to the first bearing and the second bearing;

coupling a support structure to one end of the shaft, the support structure having a slanted section and a sidewall, the sidewall defining a hollow interior portion, wherein at least a portion of the motor and the motor housing is disposed within the hollow interior portion, the sidewall having a plurality of bore holes;

inserting at least one pin into one of the bore holes to balance the mirror assembly.

16. The method of claim 15, wherein the sidewall includes a first portion and a second portion, the second portion being defined by a shoulder having a surface spaced axially apart from an end of the first portion.

17. The method of claim 15, wherein the plurality of bore holes includes a first plurality of bore holes and a second plurality of bore holes, the first plurality of bore holes being disposed in an end of the sidewall first portion, the second plurality of bore holes being disposed in the shoulder surface.

18. The method of claim 17, further comprising providing a cover coupled to the motor housing, the cover having an opening arranged to align with the first plurality of bore holes and the second plurality of bore holes.

19. The method of claim 18, further comprising rotating the support structure to align one of the first plurality of bore holes or the second plurality of bore holes with the opening.

20. The method of claim 19, further comprising inserting the at least one pin through the opening to balance the mirror assembly.

* * * * *